(12) United States Patent
Son et al.

(10) Patent No.: US 9,988,948 B2
(45) Date of Patent: Jun. 5, 2018

(54) CONTINUOUS VARIABLE VALVE DURATION APPARATUS AND ENGINE PROVIDED WITH THE SAME

(71) Applicant: HYUNDAI MOTOR COMPANY, Seoul (KR)

(72) Inventors: You Sang Son, Suwon-si (KR); Kyoung Pyo Ha, Seongnam-si (KR); Back Sik Kim, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 131 days.

(21) Appl. No.: 15/275,556

(22) Filed: Sep. 26, 2016

(65) Prior Publication Data

US 2017/0167312 A1    Jun. 15, 2017

(30) Foreign Application Priority Data

Dec. 14, 2015    (KR) .......................... 10-2015-0178652

(51) Int. Cl.
*F01L 1/34* (2006.01)
*F01L 1/047* (2006.01)
(Continued)

(52) U.S. Cl.
CPC ................. *F01L 1/34* (2013.01); *F01L 1/047* (2013.01); *F01L 1/053* (2013.01); *F01L 9/00* (2013.01);
(Continued)

(58) Field of Classification Search
CPC ..... F01L 1/34; F01L 9/00; F01L 1/047; F16H 25/2015; F16H 25/10; F16H 25/20;
(Continued)

(56) References Cited

U.S. PATENT DOCUMENTS 5,924,334 A    7/1999 Hara et al.
2002/0007809 A1*    1/2002 Miyazato ............ F01L 13/0015
123/90.16

(Continued)

FOREIGN PATENT DOCUMENTS

JP    H06-185321 A    7/1994
JP    H09-41924 A    2/1997
(Continued)

*Primary Examiner* — Mark Laurenzi
*Assistant Examiner* — Wesley Harris
(74) *Attorney, Agent, or Firm* — Brinks Gilson & Lione

(57) ABSTRACT

A continuous variable valve duration apparatus may include: a camshaft; first and second cam portions on which a cam is formed respectively, the camshaft inserted to the first and second cam portions of which relative phase angles with respect to the camshaft are variable; first and second inner brackets transmitting rotation of the camshaft to the first and second cam portions respectively; a cam lifter in which the first and second inner brackets are rotatably inserted, and a cam lifter guide slantly formed on the cam lifter; a cam cap rotatably supporting the first and the second cam portions, and the cam lifter slidably mounted to the cam cap; a control portion including a screw shaft parallel to the camshaft; and an adapter engaged with the screw shaft, on which an adapter guide slidably engaged with the cam lifter guide and moving a relative position of the cam lifter.

21 Claims, 14 Drawing Sheets

(51) Int. Cl.
*F01L 9/00* (2006.01)
*F16H 25/10* (2006.01)
*F16H 25/20* (2006.01)
*F01L 1/053* (2006.01)
*F01L 1/356* (2006.01)
*F01L 13/00* (2006.01)

(52) U.S. Cl.
CPC .......... *F01L 13/0015* (2013.01); *F16H 25/10* (2013.01); *F16H 25/20* (2013.01); *F16H 25/2015* (2013.01); *F01L 1/356* (2013.01); *F01L 2001/0475* (2013.01); *F01L 2001/0476* (2013.01); *F01L 2001/0537* (2013.01); *F01L 2013/103* (2013.01); *F01L 2810/02* (2013.01); *F16H 2025/209* (2013.01); *F16H 2025/2084* (2013.01); *F16H 2025/2087* (2013.01)

(58) Field of Classification Search
CPC ....... F16H 2025/2087; F16H 2025/209; F16H 2025/2084
USPC ............................................ 123/90.15–90.17
See application file for complete search history.

(56) References Cited

U.S. PATENT DOCUMENTS

2009/0007862 A1* 1/2009 Nakamura ............ F01L 1/3342
                                                  123/90.12
2010/0012062 A1* 1/2010 Nakamura .............. F01L 1/185
                                                  123/90.18

FOREIGN PATENT DOCUMENTS

JP          5582195 B2      7/2014
JP       2015-117692 A      6/2015

* cited by examiner

FIG. 3
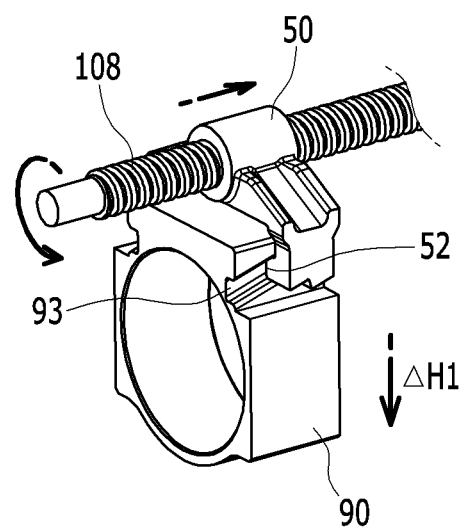
(a)
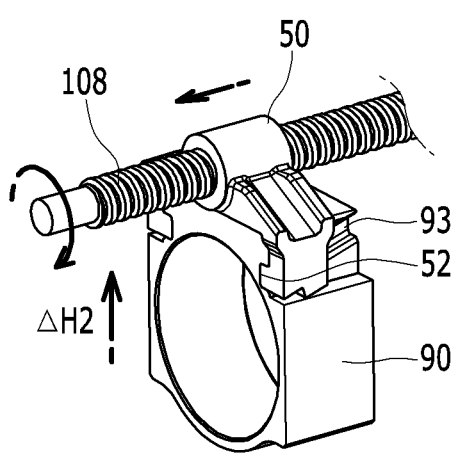
(b)

CONTINUOUS VARIABLE VALVE DURATION APPARATUS AND ENGINE PROVIDED WITH THE SAME

CROSS-REFERENCE TO RELATED APPLICATION

This application claims priority to and the benefit of Korean Patent Application No. 10-2015-0178652, filed on Dec. 14, 2015, the entire contents of which are incorporated herein by reference.

FIELD

The present disclosure relates to a continuous variable valve duration apparatus and an engine provided with the same.

BACKGROUND

The statements in this section merely provide background information related to the present disclosure and may not constitute prior art.

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various researches, such as designing of a plurality of cams and a continuous variable valve lift (CVVL) that can change valve lift according to engine speed, have been undertaken.

Also, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

The above information disclosed in this Background section is only for enhancement of understanding of the background of the present disclosure and therefore it may contain information that does not form the prior art that is already known to a person of ordinary skill in the art.

SUMMARY

Various aspects of the present disclosure provide a continuous variable valve duration apparatus and an engine provided with the same which may vary opening duration of a valve according to operation conditions of an engine, with a simple construction.

A continuous variable valve duration apparatus according to an exemplary form of the present disclosure may include: a camshaft; first and second cam portions on which a cam is formed respectively, the camshaft inserted to the first and second cam portions of which relative phase angles with respect to the camshaft are variable; first and second inner brackets transmitting rotation of the camshaft to the first and second cam portions respectively; a cam lifter in which the first and second inner brackets are rotatably inserted, a cam lifter guide slantly formed on the cam lifter of which a relative position with respect to the camshaft is variable; a cam cap rotatably supporting the first and the second cam portions, and the cam lifter slidably mounted to the cam cap; a control portion including a screw shaft parallel to the camshaft; and an adapter engaged with the screw shaft, on which an adapter guide slidably engaged with the cam lifter guide and moving a relative position of the cam lifter according to rotation of the screw shaft.

The control portion may include a control motor and a planetary gear set connected to the screw shaft and transmitting rotation of the control motor to the screw shaft.

The control portion may further include a worm wheel connected to the planetary gear set and a worm gear engaged with the worm wheel.

The control portion may further include a control portion housing and a housing cover connected to the control portion housing, wherein the planetary gear set, the worm wheel and the worm gear may be disposed within the control portion housing.

The control portion may further include a position sensor disposed within the control portion housing for detecting rotation of the control shaft.

A cam cap guide for guiding movement of the cam lifter may be formed on the cam cap.

A cam cap bearing for rotatably supporting the screw shaft may be formed in the cam cap.

The continuous variable valve duration apparatus may further include a thrust screw cap formed on cylinder head for limiting length direction movement of the screw shaft.

A cam key may be formed on the first and second cam portions respectively, a first and a second sliding holes may be formed in the first and second inner brackets respectively, a cam key pin, on which a cam key slot where the cam key is slidably inserted therein is formed, may be rotatably inserted into the each first sliding hole, a camshaft pin may be connected to the camshaft, and a slider pin, on which a camshaft pin slot where the camshaft pin is slidably inserted therein is formed, may be rotatably inserted into the each second sliding hole.

The continuous variable valve duration apparatus may further include a cam lift bearing disposed between the first and second inner brackets and the cam lifter respectively.

The continuous variable valve duration apparatus may further include a partition disposed between the first and second inner brackets.

The cam may be formed on the first and the second cam portions as a pair, a cam cap connecting portion may be formed between the two cams (i.e., the paired cams) of each of the first and second cam portions, and a cam support for rotatably supporting the cam connecting portion may be is formed on the cam cap.

A cam key may be is formed on the first and second cam portions respectively, a first and a second sliding holes may be formed in the first and second inner brackets respectively, a cam key pin, on which a cam key slot where the cam key is slidably inserted therein is formed, may be rotatably inserted into the each first sliding hole, and a slider pin may include a pin body and a pin head integrally formed with the pin body, and wherein the pin body may be slidably inserted into the camshaft and the pin head may be rotatably inserted into the second sliding hole.

A camshaft oil hole may be formed in the camshaft along a length direction thereof, a body oil hole communicated with the camshaft oil hole may be formed in the pin body, and an oil groove communicated with the body oil hole may be formed in the pin head.

An engine according to an exemplary form of the present disclosure may include a camshaft; first and second cam portions on which a cam is formed respectively, the camshaft inserted to the first and second cam portions of which relative phase angles with respect to the camshaft are variable; first and second inner brackets transmitting rotation of the camshaft to the first and second cam portions respectively; a cam lifter in which the first and second inner brackets are rotatably inserted, a cam lifter guide slantly formed on the cam lifter of which a relative position with respect to the camshaft is variable; a cam cap rotatably supporting the first and the second cam portions, and the cam lifter slidably mounted to the cam cap; a control portion including a screw shaft parallel to the camshaft; and an adapter engaged with the screw shaft, on which an adapter guide slidably engaged with the cam lifter guide and moving a relative position of the cam lifter according to rotation of the screw shaft.

The control portion may include a control motor, a planetary gear set connected to the screw shaft and transmitting rotation of the control motor to the screw shaft, a worm wheel connected to the planetary gear set, and a worm gear engaged with the worm wheel.

The control portion may further include a control portion housing and a housing cover connected to the control portion housing, wherein the planetary gear set, the worm wheel and the worm gear may be disposed within the control portion housing.

The control portion may further include a position sensor disposed within the control portion housing for detecting rotation of the control shaft.

A cam key may be formed on the first and second cam portions respectively, a first and a second sliding holes may be formed in the first and second inner brackets respectively, a cam key pin, on which a cam key slot where the cam key is slidably inserted therein is formed, may be rotatably inserted into the each first sliding hole, a camshaft pin may be connected to the camshaft, and a slider pin, on which a camshaft pin slot where the camshaft pin is slidably inserted therein is formed, may be rotatably inserted into the each second sliding hole.

A cam key may be is formed on the first and second cam portions respectively, a first and a second sliding holes may be formed in the first and second inner brackets respectively, a cam key pin, on which a cam key slot where the cam key is slidably inserted therein is formed, may be rotatably inserted into the each first sliding hole, and a slider pin may include a pin body and a pin head integrally formed with the pin body, and wherein the pin body may be slidably inserted into camshaft and the pin head may be rotatably inserted into the second sliding hole.

A camshaft oil hole may be formed in the camshaft along a length direction thereof, a body oil hole communicated with the camshaft oil hole may be formed in the pin body, and an oil groove communicated with the body oil hole may be formed in the pin head.

As described above, the continuous variable valve duration apparatus according to an exemplary form of the present disclosure may vary an opening duration of a valve according to operation conditions of an engine, with a simple construction.

The exemplary continuous variable valve duration apparatus of the present disclosure may be reduced in size and thus the entire height of a valve train may be reduced.

Since the continuous variable valve duration apparatus may be applied to an existing engine without excessive modification, thus productivity may be enhance and production cost may be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a perspective view of an adapter of the continuous variable valve duration apparatus according to an exemplary form of the present disclosure;

Figure 1:
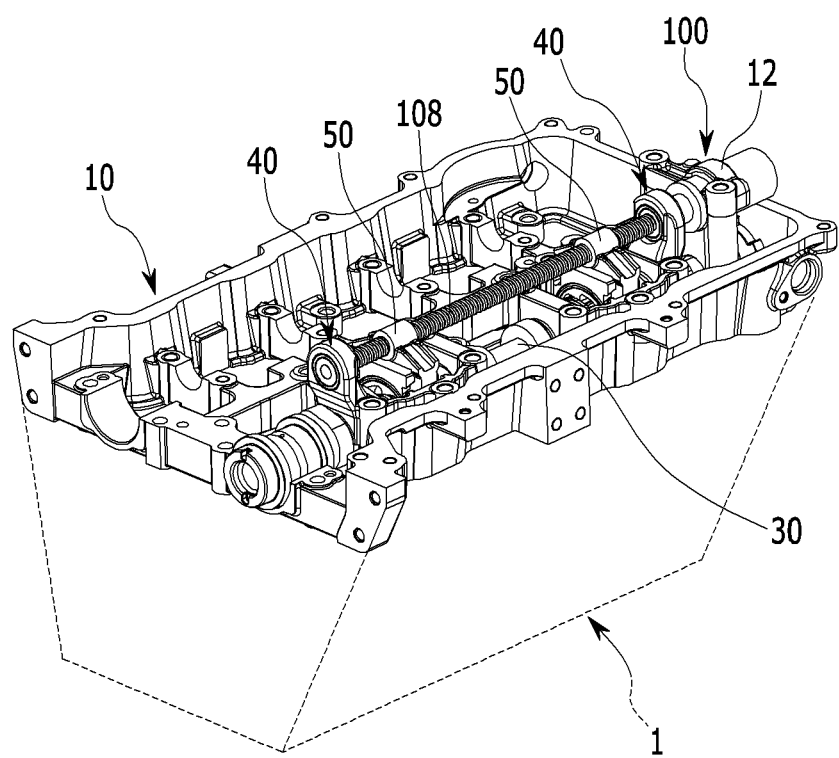
FIG. 1 is a perspective view of an engine provided with a continuous variable valve duration apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure A part irrelevant to the description will be omitted to clearly describe the present disclosure.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

Figure 2:
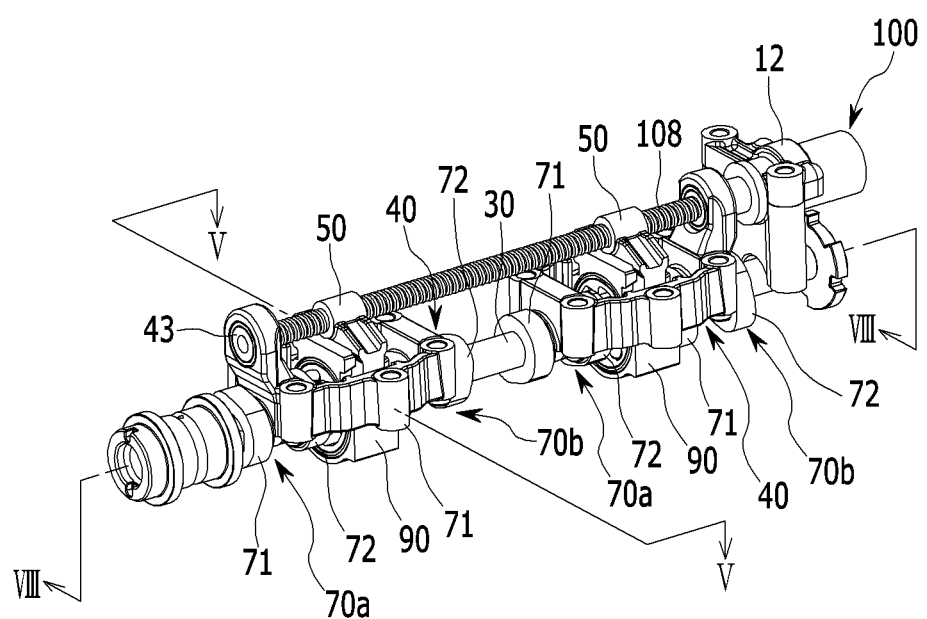
FIG. 2 is a perspective view of a continuous variable valve duration apparatus according to an exemplary form of the present disclosure.

FIG. 1 is a perspective view of an engine provided with a continuous variable valve duration apparatus, and FIG. 2 is a perspective view of a continuous variable valve duration apparatus.

Figure 4:
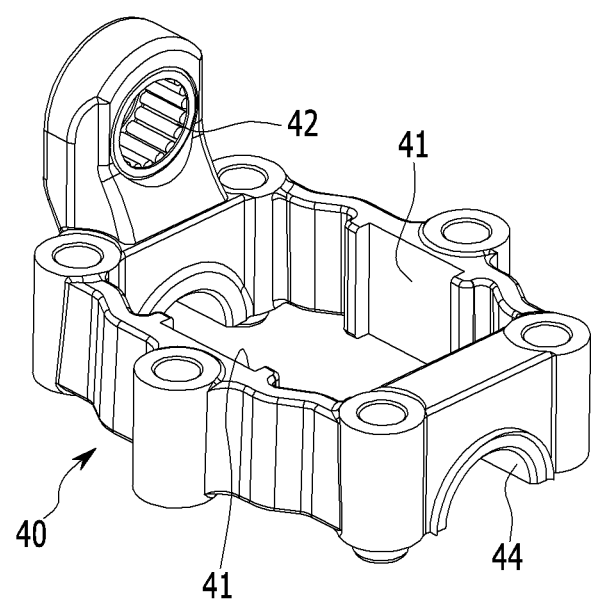
FIG. 4 is a perspective view of a cam cap of the continuous variable valve duration apparatus according to an exemplary form of the present disclosure.

FIG. 3 is a perspective view of an adapter of the continuous variable valve duration apparatus, and FIG. 4 is a perspective view of a cam cap of the continuous variable valve duration apparatus.

Figure 5:
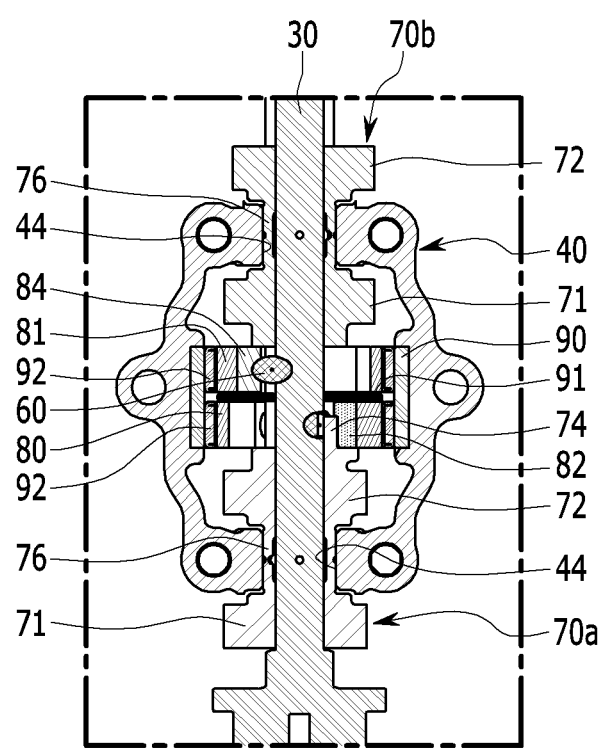
FIG. 5 is a cross-sectional view along line V-V of FIG. 2.
Figure 6:
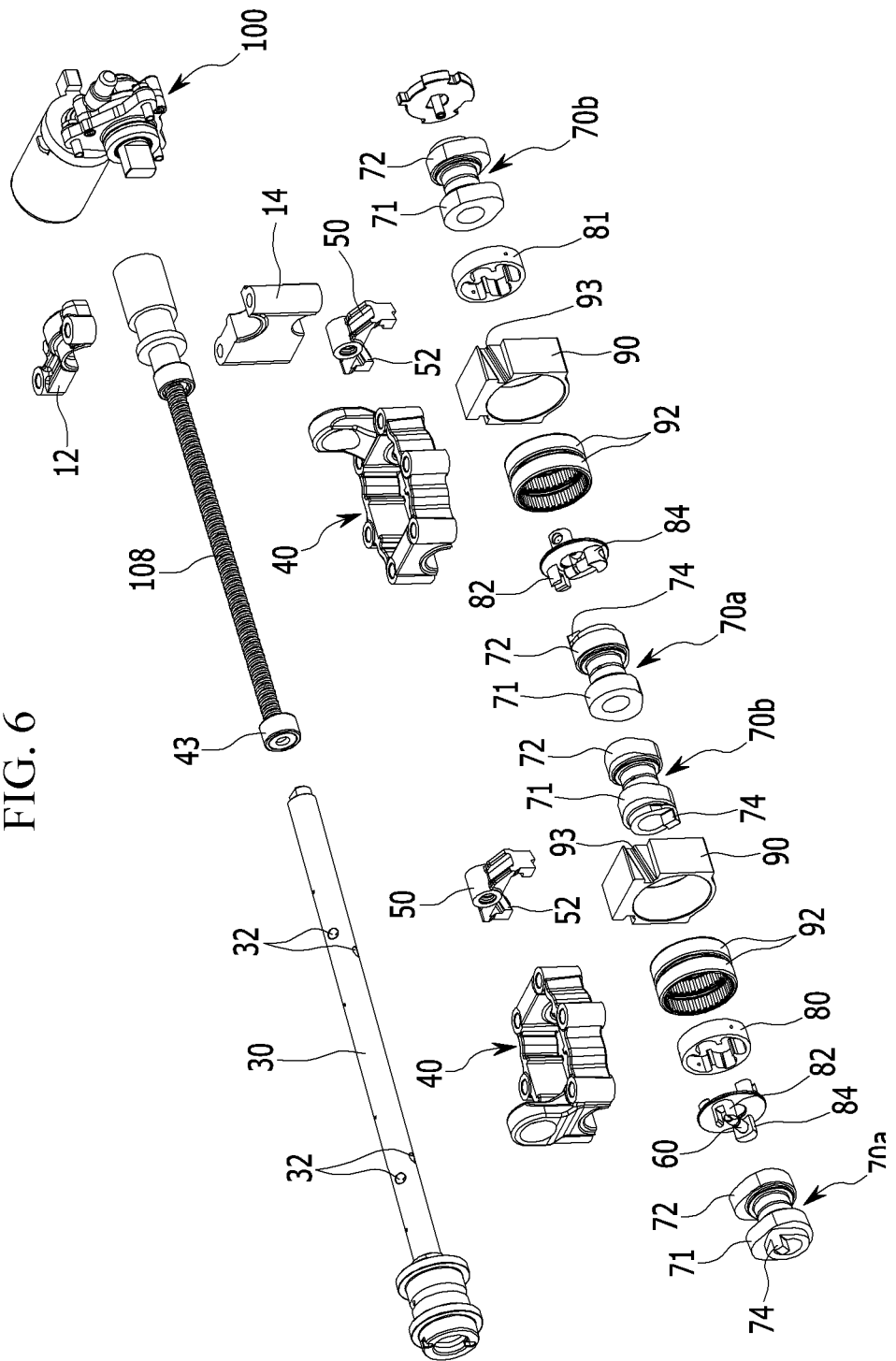
FIG. 6 is an exploded perspective view of an exemplary continuous variable valve duration apparatus of the present disclosure.

FIG. 5 is a cross-sectional view along line V-V of FIG. 2, and FIG. 6 is an exploded perspective views of an exemplary continuous variable valve duration apparatus.

Figure 7:
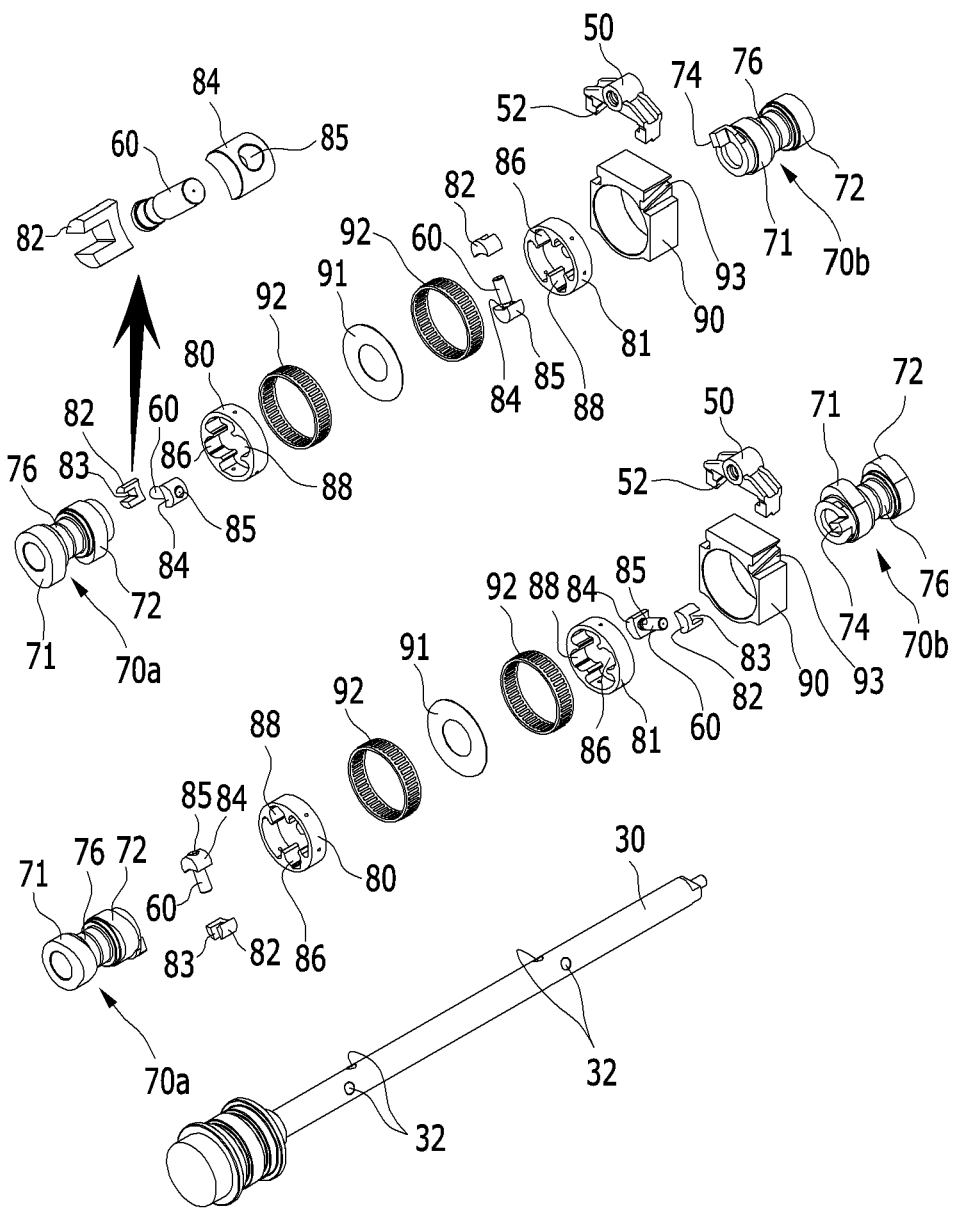
FIG. 7 is a partial exploded perspective view of an exemplary continuous variable valve duration apparatus of the present disclosure.
Figure 8:
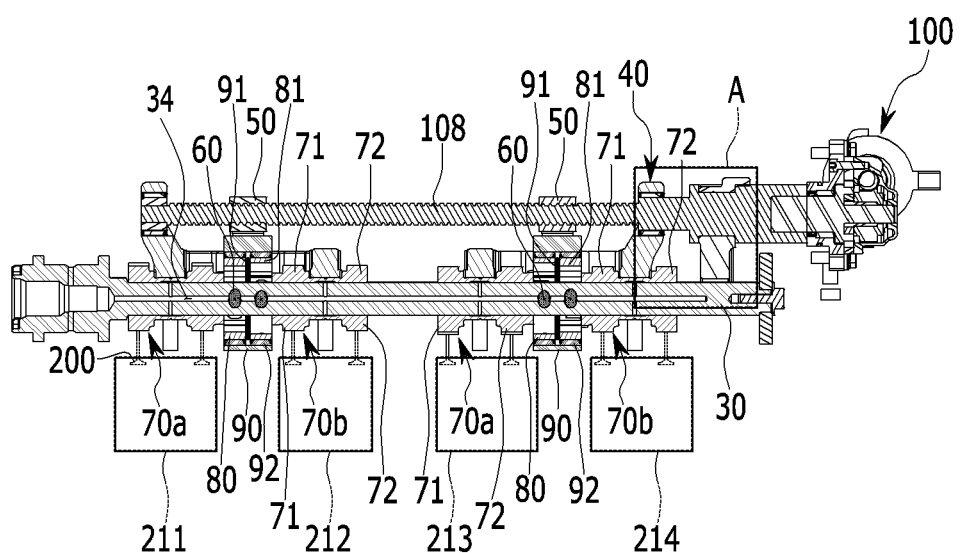
FIG. 8 is a cross-sectional view along line VIII-VIII of FIG. 2.

FIG. 7 is a partial exploded perspective view of an exemplary continuous variable valve duration apparatus, and FIG. 8 is a cross-sectional view along line VIII-VIII of FIG. 2.

Referring to FIG. 1 to FIG. 8, an engine 1 includes: a cylinder head 10 and a continuous variable valve duration apparatus mounted to the cylinder head 10. In detailed description and claims, the cylinder head may include a cam carrier.

The continuous variable valve duration apparatus includes: a camshaft 30; a first and a second cam portions 70a and 70b on which a cam 71 and 72 is formed respectively, the camshaft 30 inserted to the first and second cam portions 70a and 70b of which relative phase angles with respect to the camshaft 30 are variable; first and second inner brackets 80 and 81 transmitting rotation of the camshaft 30 to the first and second cam portions 70a and 70b respectively; a cam lifter 90 in which the first and second inner brackets 80 and 81 are rotatably inserted, on which a cam lifter guide 93 is formed, the lifter guide 93 being slanted, and a relative position of the cam lifter 90 with respect to the camshaft 30 being variable; a cam cap 40 rotatably supporting the first and the second cam portions 70a and 70b, and the cam lifter 90 slidably mounted to the cam cap 40; a control portion 100 including a screw shaft 108 parallel to the camshaft 30, and an adapter 50 engaged with the screw shaft 108, on which an adapter guide 52 slidably engaged with the cam lifter guide 93 and moving a relative position of the cam lifter 90 according to rotation of the screw shaft 108.

The camshaft 30 may be an intake camshaft or an exhaust camshaft.

In the present disclosure, 4 cylinders 211, 212, 213 and 214 are formed to the engine, but it is not limited thereto.

A cam cap guide 41 is formed on the cam cap 40 for guiding movement of the cam lifter 90. The cam cap guide 41 may guide movement of the cam lifter 90 and prevent oscillation or vibration of the cam lifter 90.

A cam cap bearing 42 for rotatably supporting of the screw shaft 108 is mounted in the cam cap 40. A cam cap bearing bushing 43 is connected to the screw shaft 108 and inserted into the cam cap bearing 42.

Two cams 71 and 72 may be formed on the first and the second cam portion 70a and 70b respectively, and a cam connecting portion 76 may be formed between the two cam 71 and 72. And a cam supporting portion 44 is formed to the cam cap 40 for rotatably supporting the cam connecting portion 76.

Since the cam cap 40 guides the movement of the cam lifter 90, rotatably supports the screw shaft 108 and the first, second cam portion 70a and 70b, thus structure of the continuous variable valve duration may be simplified and element number may be reduced.

The cams 71 and 72 rotate and open the valve 200.

A cam key 74 is formed on the first and second cam portions 70a and 70b respectively, and a first sliding hole 86 and a second sliding hole 88 are formed in the first and second inner brackets 80 and 81 respectively.

A cam key pin 82 of which a cam key slot 83 where the cam key 74 is slidably inserted therein is formed thereto and the cam key pin 82 is rotatably inserted into the each first sliding hole 86.

A camshaft hole 32 is formed in the camshaft 30 and a camshaft pin 60 is inserted into the camshaft hole 32 to be connected to the camshaft 30. And a slider pin 84 of which a camshaft pin slot 85 where the camshaft pin 60 is slidably inserted therein is formed thereto and the slider pin 84 is rotatably inserted into the each second sliding hole 88.

A cam lifter bearing 92 may be disposed between the cam lifter 90 and the first and the second inner brackets 80 and 81 respectively, and thus relative rotations between the each cam lifter 90 and the first and the second inner brackets 80 and 81 and rigidity may be obtained. The cam lifter bearing 92 may be a needle bearing, a ball bearing, a roller bearing and so on, but not limited to thereto.

A partition 91 is disposed between the first and second inner brackets 80 and 81 for inhibiting or preventing the rotations of the first and second inner brackets 80 and 81 from being interrupted.

As shown in FIG. 8, since the cam lifter 90 is disposed between the first cam portion 70a and the second cam portion 70b, engine layout may be simplified and one cam lifter 90 may control rotational speed of the first cam portion 70a and the second cam portion 70b simultaneously. Thus, the continuous variable valve duration apparatus may be constructed with simplified and elements number may be reduced.

Also, since elements for controlling the valve duration may be reduced, thus power loss of the engine may be reduced.

Figure 9:
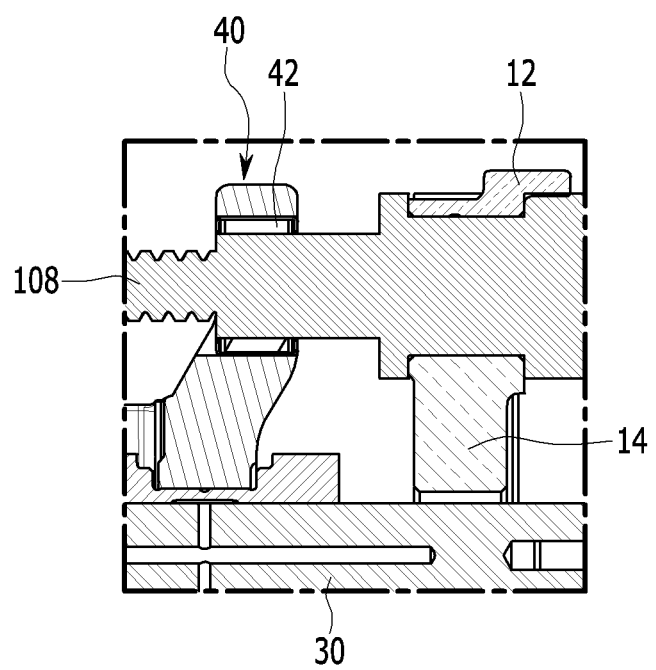
FIG. 9 is an enlarged view of A of FIG. 8.

FIG. 9 is an enlarged view of A of FIG. 8.

Referring to FIG. 1, FIG. 8 and FIG. 9, a thrust screw cap 12 is formed to the cylinder head 10 to limit movement of the screw shaft 108 in a length direction thereof.

A cap supporter 14 is mounted to the cylinder head 10 and the thrust screw cap 12 is connected to the cap supporter 14 and supports the thrust screw 108 for limiting length direction movement of the screw shaft 108.

Figure 10:
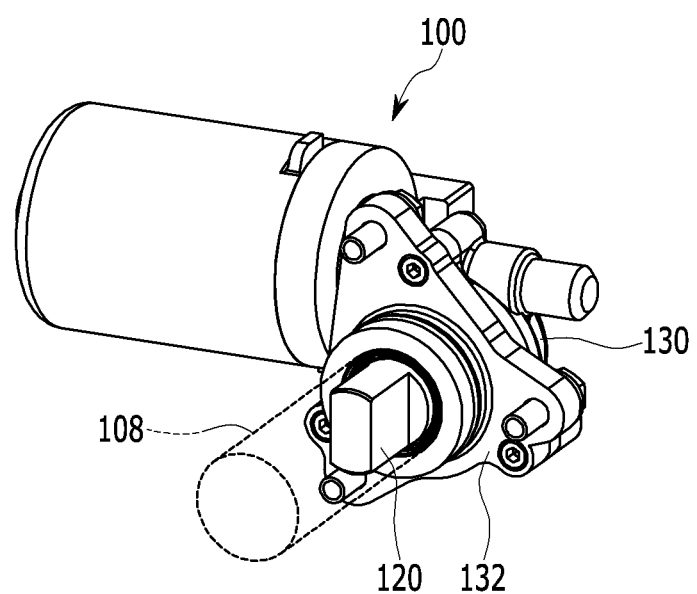
FIG. 10 is a perspective view of a control portion of a continuous variable valve duration apparatus according to an exemplary form of the present disclosure.
Figure 11:
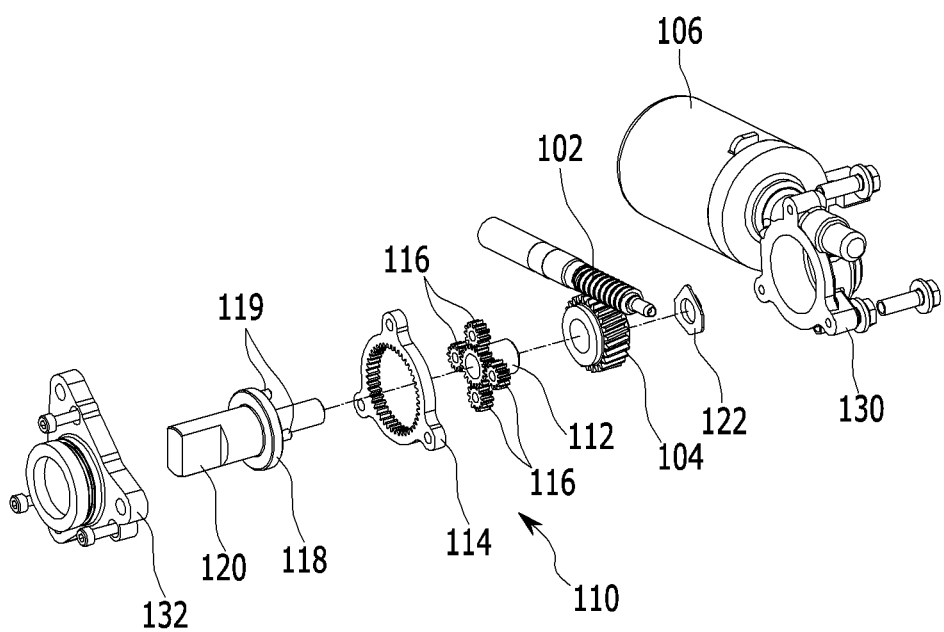
FIG. 11 is an exploded perspective view of a control portion of a continuous variable valve duration apparatus according to an exemplary form of the present disclosure.

FIG. 10 is a perspective view of a control portion of a continuous variable valve duration apparatus and FIG. 11 is an exploded perspective view of a control portion of a continuous variable valve duration apparatus.

Referring to FIG. 10 and FIG. 11, the control portion 100 includes a control motor 106 and a planetary gear set 110 connected to the screw shaft 108 and transmitting rotation of the control motor 106. The planetary gear set 110 may connects the control motor 106 and the screw shaft 108 and increase gear ratio, thus motor capacity of the control motor 106 may be reduced.

The control portion 100 may further include a worm wheel 104 connected to the planetary gear set 110 and a worm gear 102 engaged with worm wheel 104. By applying the worm gear 102, the worm wheel 104 and the planetary gear set 110, gear ratio may be further increased, thus motor capacity of the control motor 106 may be further reduced.

The control portion 100 may further include a control portion housing 130, and a housing cover 132 connected to the control portion housing 130. And the planetary gear set 110, the worm wheel 104 and the worm gear 102 are disposed within the control portion housing 130.

Since the planetary gear set 110, the worm gear 102 and the worm wheel 104 are disposed within the control portion housing 130, thus engine layout may be simplified.

A connection shaft 120 on which a planetary gear cage 118 and a planetary gear shaft 119 are formed is connected with the screw shaft 108.

The planetary gear set 110 includes a sun gear 112 receiving rotation of the control motor 106 through the worm wheel 104, ring gear 114 and a planetary gear 116 engaged with the sun gear 112 and the ring gear 114.

The ring gear 114 is connected to the housing cover 132, the planetary gear 116 is connected to the planetary gear shaft 119 and the rotation of the control motor 106 is reduced in speed and transmitted to the screw shaft 108.

A position sensor 122 disposed within the control portion housing 130 for detecting the rotation of the screw shaft 108.

A position sensor 122 disposed within the control portion housing 130 for detecting the rotation of the control shaft 108.

Figure 12:
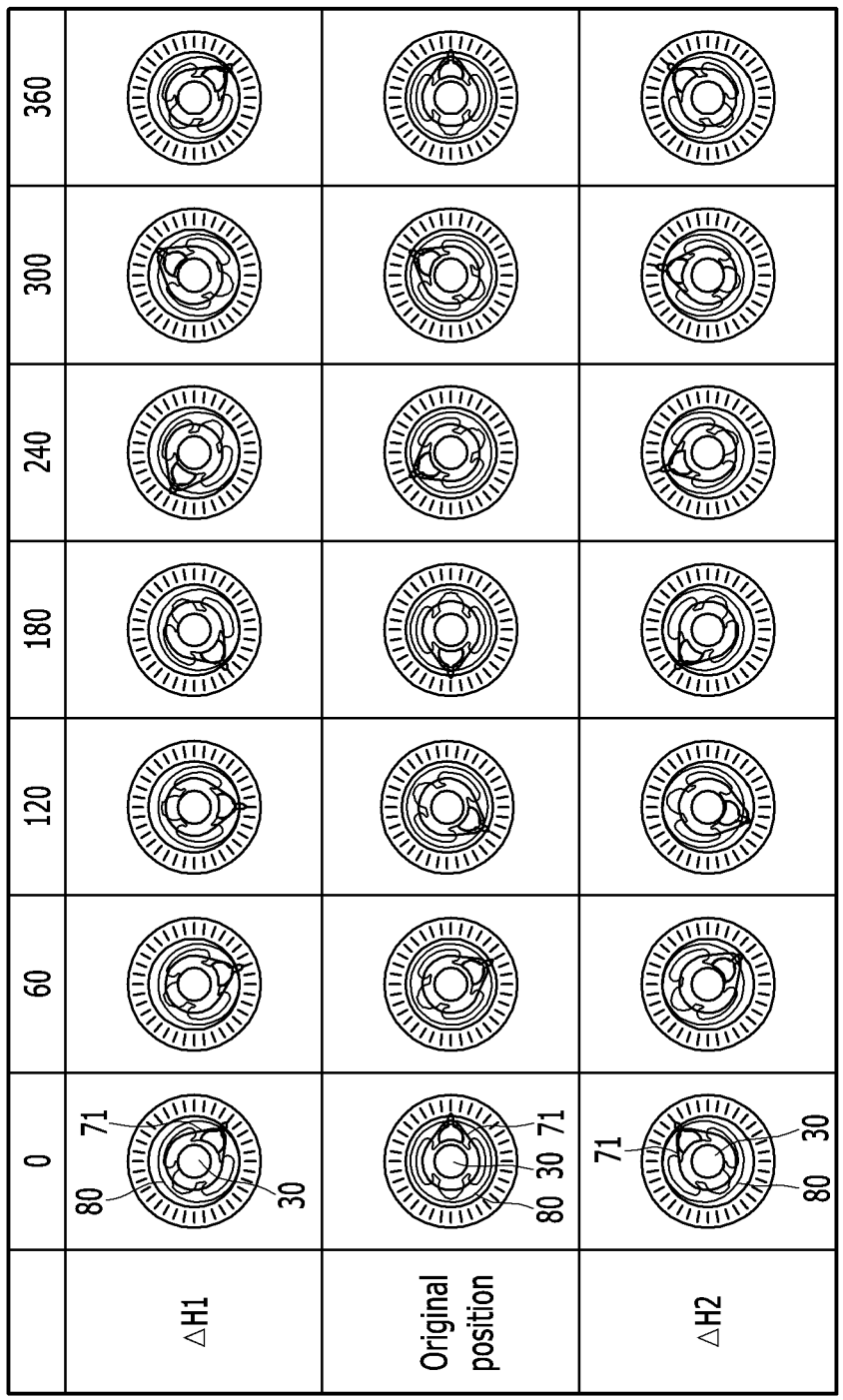
FIG. 12 is a table showing various operations of an exemplary continuous variable valve duration apparatus of the present disclosure.
Figure 13:
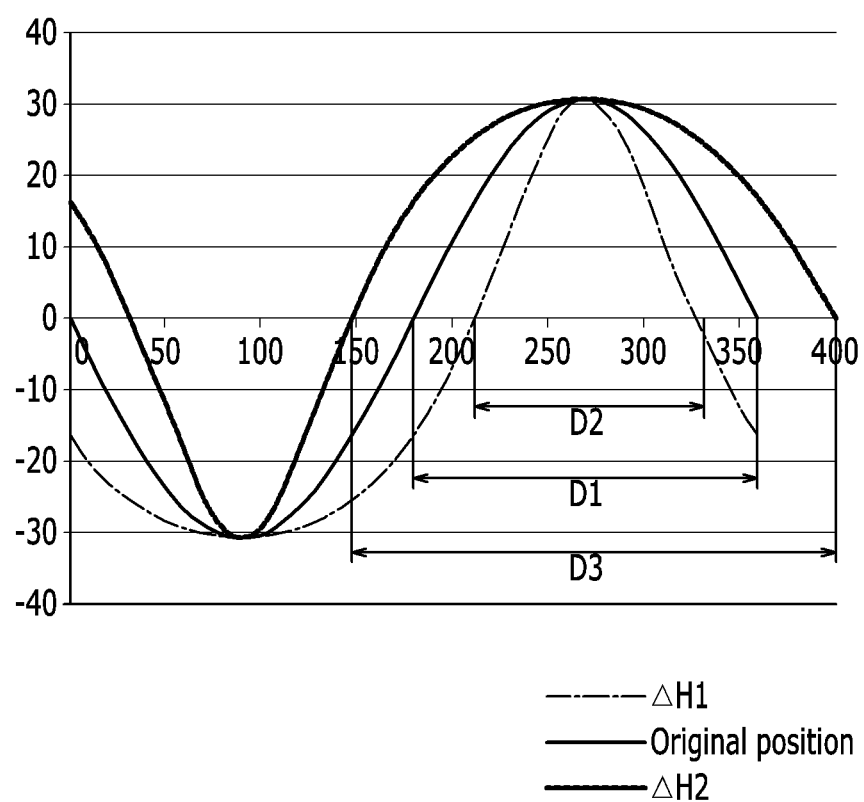
FIG. 13 is a graph showing various operations of an exemplary continuous variable valve duration apparatus of the present disclosure.

FIG. 12 is a table showing various operations of an exemplary continuous variable valve duration apparatus, and FIG. 13 is a graph showing various operations of an exemplary continuous variable valve duration apparatus.

Referring to FIG. 1 to FIG. 13, operations of the exemplary continuous variable valve duration apparatus will be described.

When rotation centers of the camshaft 30 and the first and second inner brackets 80 and 81 are coincident, that is, the cam lifter 90 is positioned at an original position as shown in FIG. 12, the cams 71 and 72 rotate with the same phase angle of the camshaft 30. That is, the cams 71 and 72 and the camshaft 30 rotate with the same speed.

According to engine operation states, an ECU (engine control unit or electric control unit) transmits control signals to the control motor 106 of the control portion 100 to rotate the screw shaft 108. Then, the adapter 50 engaged with the screw shaft 108 moves along a length direction of the screw shaft 108, and the cam lifter 90 moves upward or downward along the cam cap guide 41 due to the engagement of the adapter guide 52 and the cam lifter guide 93.

Since the adapter 50 is interposed and engaged with the screw shaft 108 and the cam lifter 90, the cam lifter 90 moves smoothly.

According to the rotation of the screw shaft 108, relative positions of the cam lifter 90 and the first and the second inner brackets 80 and 81 with respect to a rotation center of the camshaft 30 changed upward or downward.

When, the position of the cam lifter 90 with respect to the camshaft 30 is changed, the relative rotation speed of the cams 71 and 72 with respect to the rotation speed of the camshaft 30 are changed.

While the camshaft pin 60 is rotated together with the camshaft 30, the camshaft pin 60 is slidable within the camshaft pin slot 85, the slider pin 84 is rotatably inserted into the second sliding hole 88, the cam key pin 82 is rotatably inserted into the first sliding hole 82, and the cam key 74 is slidable within the cam key slot 83. Thus the relative rotation speed of the cams 71 and 72 with respect to the rotation speed of the camshaft 30 is changed.

As shown in FIG. 3, while the phase angle of the camshaft 30 is constantly changed when the relative position of the cam lifter 90 with respect to the rotation center of the camshaft 30 is changed downward as ΔH1, as shown in FIG. 12, the rotation speed of the cams 71 and 72 is relatively slower than rotation speed of the camshaft 30 near 60 to 120 degree, then then the rotation speed of the cams 71 and 72 is relatively faster than rotation speed of the camshaft 30 near 240 to 300 degree.

As shown in FIG. 4, while the phase angle of the camshaft 30 is constantly changed when the relative position of the cam lifter 90 with respect to the rotation center of the camshaft 30 is changed upward as ΔH2, as shown in FIG. 12, the rotation speed of the cams 71 and 72 is relatively faster than rotation speed of the camshaft 30 near 60 to 120 degree, then then the rotation speed of the cams 71 and 72 is relatively slower than rotation speed of the camshaft 30 near 240 to 300 degree.

That is, as shown in FIG. 13, valve duration D2 in the case that the relative position of the cam lifter 90 is changed to ΔH1 is shorter than valve duration D1 in the case that the position of the cam lifter 90 is at the original position.

Also, valve duration D3 in the case that the relative position of the cam lifter 90 is changed to ΔH2 is longer than valve duration D1 in the case that the position of the cam lifter 90 is at the original position.

In FIG. 13, for better comprehension and ease of description, peak points in FIG. 10 are constant, but it is not limited thereto.

According to adjusting contacting positions of the valve 200 and the cam 71 and 72, contacting angles of the valve 200 and the cam 71 and 72, a position of the cam key 74 and so on, valve duration may be enlarged by advancing opening timing and retarding closing timing of the valve 200. Or, valve duration may be shortened by retarding opening timing and advancing closing timing of the valve 200.

Also, opening timing of the valve 200 may be constant and closing timing of the valve 200 may be retarded or advanced as requested.

Also, closing timing of the valve 200 may be constant and opening timing of the valve 200 may be retarded or advanced as requested.

Figure 14:
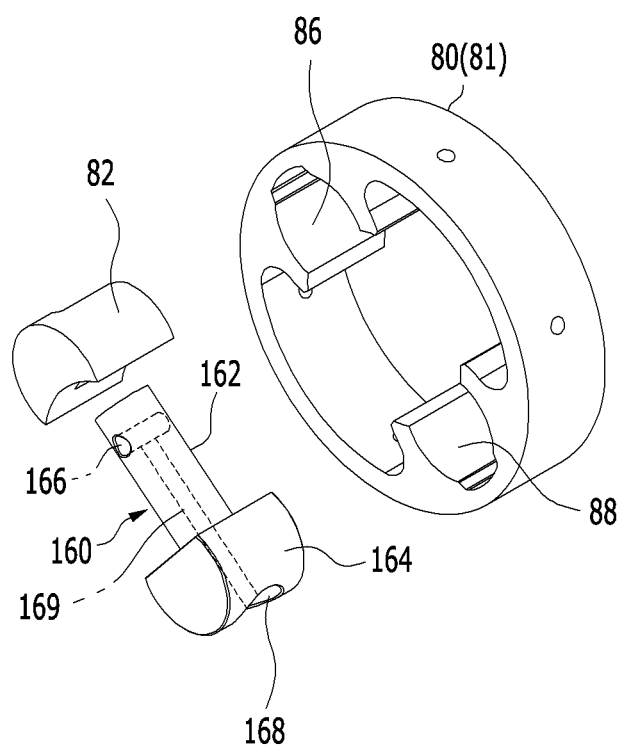
FIG. 14 is a drawing showing a slider pin of a continuous variable valve duration apparatus according to a modified form of the present disclosure.

FIG. 14 is a drawing showing a slider pin of a continuous variable valve duration apparatus according to a modified form of the present disclosure.

In the exemplary form, the camshaft pin and the slider pin are disconnected, however a slider pin 160 as shown in FIG. 10 includes a pin body 162 slidably inserted into the camshaft hole 32 of camshaft 30 and a pin head 164 integrally formed with the pin body 162 and rotatably inserted into the second sliding hole 88.

A camshaft oil hole 34 (referring to FIG. 8) is formed in the camshaft 30 along a length direction thereof and a body oil hole 166 communicated with the camshaft oil hole 34 is formed in the pin body 162.

And an oil groove 168 communicated with the body oil hole 166 is formed in the pin head 164 through a communicating hole 169.

Since lubricant may be supplied from the camshaft oil hole 34 to the oil groove 168 through the body oil hole 166 and the communicating hole 169, thus friction between the pin head 164 and the second sliding hole 88 may be reduced.

Except the slider pin, operations and structures of the continuous variable valve duration apparatus according to a modified form of the present disclosure are the same of the exemplary form described above, repeated description will be omitted.

As described above, the exemplary continuous variable valve duration apparatus of the present disclosure may perform various valve durations according to operation conditions of an engine.

The exemplary continuous variable valve duration apparatus of the present disclosure may be reduced in size and thus the entire height of a valve train may be reduced.

Particularly, since the motor and so on of the control portion may be mounted outside of the cam carrier thus the entire height of an engine may be reduced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| 1: engine | 10: cylinder head |
| 12: thrust screw cap | 14: cap supporter |
| 30: camshaft | 32: camshaft hole |
| 40: cam cap | 41: cam cap guide |
| 42: cam cap bearing | 43: cam cap bearing bushing |
| 44: cam supporting portion | 50: adapter |
| 52: adapter guide | 60: camshaft pin |
| 70a, 70b: first, second cam portion | 71, 72: cam |
| 74: cam key | 76: cam connecting portion |
| 80: first inner bracket | 81: second inner bracket |
| 82: cam key pin | 83: cam key slot |
| 84: slider pin | 85: camshaft pin slot |
| 86: first sliding hole | 88: second sliding hole |
| 90: cam lifter | 91: partition |
| 92: cam lift bearing | 93: cam lifter guide |
| 100: control portion | 102: worm gear |
| 104: worm wheel | 106: control motor |
| 108: screw shaft | 110: planetary gear set |
| 112: sun gear | 114: ring gear |
| 116: planetary gear | 118: planetary gear cage |
| 119: planetary gear shaft | 120: connection shaft |
| 122: position sensor | 130: control portion housing |
| 132: housing cover | 160: slider pin |
| 162: pin body | 164: pin head |
| 166: body oil hole | 168: oil groove |
| 169: communicate hole | 200: valve |
| 211-214: 1-4 cylinders | |

What is claimed is:

1. A continuous variable valve duration apparatus comprising:
   a camshaft;
   first and second cam portions on which a cam is formed respectively, the camshaft inserted to the first and second cam portions such that relative phase angles with respect to the camshaft are variable;
   first and second inner brackets configured to transmit rotation of the camshaft to the first and second cam portions respectively;
   a cam lifter in which the first and second inner brackets are rotatably inserted, a cam lifter guide formed on the cam lifter of which a relative position with respect to the camshaft is variable, the cam lifter guide being slanted;
   a cam cap configured to rotatably support the first and the second cam portions, the cam lifter slidably mounted to the cam cap;
   a control portion including a screw shaft parallel to the camshaft; and
   an adapter engaged with the screw shaft, on which an adapter guide slidably engaged with the cam lifter guide and moving a relative position of the cam lifter according to rotation of the screw shaft.

2. The continuous variable valve duration apparatus of claim 1, wherein the control portion comprises:
   a control motor; and
   a planetary gear set connected to the screw shaft and configured to transmit rotation of the control motor to the screw shaft.

3. The continuous variable valve duration apparatus of claim 2, wherein the control portion further comprises:
   a worm wheel connected to the planetary gear set; and
   a worm gear engaged with the worm wheel.

4. The continuous variable valve duration apparatus of claim 3, wherein the control portion further comprises:
   a control portion housing; and
   a housing cover connected to the control portion housing, wherein the planetary gear set, the worm wheel and the worm gear are disposed within the control portion housing.

5. The continuous variable valve duration apparatus of claim 4, wherein the control portion further comprises:
   a position sensor disposed within the control portion housing and configured to detect rotation of the control shaft.

6. The continuous variable valve duration apparatus of claim 1, wherein a cam cap guide for guiding movement of the cam lifter is formed to the cam cap.

7. The continuous variable valve duration apparatus of claim 1, wherein a cam cap bearing configured to rotatably support the screw shaft is formed in the cam cap.

8. The continuous variable valve duration apparatus of claim 1, further comprising a thrust screw cap formed on a cylinder head and configured to limit a movement of the screw shaft in a length direction thereof.

9. The continuous variable valve duration apparatus of claim 1, wherein
   a cam key is formed on the first and second cam portions, respectively;
   first and a second sliding holes are formed in the first and second inner brackets, respectively;
   a cam key pin, on which a cam key slot where the cam key is slidably inserted therein is formed, is rotatably inserted into the each first sliding hole;
   a camshaft pin is connected to the camshaft; and
   a slider pin, on which a camshaft pin slot where the camshaft pin is slidably inserted therein is formed, is rotatably inserted into the each second sliding hole.

10. The continuous variable valve duration apparatus of claim 1, further comprising a cam lift bearing disposed between the first and second inner brackets and the cam lifter, respectively.

11. The continuous variable valve duration apparatus of claim 1, further comprising a partition disposed between the first and second inner brackets.

12. The continuous variable valve duration apparatus of claim 1, wherein
   the cam is formed on the first and the second cam portions as a pair;
   a cam cap connecting portion is formed between the paired cams of each of the first and second cam portions; and
   a cam support configured rotatably support the cam connecting portion is formed on the cam cap.

13. The continuous variable valve duration apparatus of claim 1, wherein
a cam key is formed on the first and second cam portions, respectively;
first and a second sliding holes are formed in the first and second inner brackets, respectively;
a cam key pin, on which a cam key slot where the cam key is slidably inserted therein is formed, is rotatably inserted into the each first sliding hole; and
a slider pin includes a pin body and a pin head integrally formed with the pin body, and
wherein the pin body is slidably inserted into the camshaft, and the pin head is rotatably inserted into the second sliding hole.

14. The continuous variable valve duration apparatus of claim 13, wherein
a camshaft oil hole is formed in the camshaft along a length direction thereof;
a body oil hole communicated with the camshaft oil hole is formed in the pin body; and
an oil groove communicated with the body oil hole is formed in the pin head.

15. An engine comprising:
a camshaft;
first and second cam portions on which a cam is formed respectively, the camshaft inserted to the first and second cam portions of which relative phase angles with respect to the camshaft are variable;
first and second inner brackets configured to transmit rotation of the camshaft to the first and second cam portions respectively;
a cam lifter in which the first and second inner brackets are rotatably inserted, a cam lifter guide formed on the cam lifter of which a relative position with respect to the camshaft is variable, the cam lifter guide being slanted;
a cam cap configured to rotatably support the first and the second cam portions, the cam lifter slidably mounted to the cam cap;
a control portion including a screw shaft parallel to the camshaft; and
an adapter engaged with the screw shaft, on which an adapter guide slidably engaged with the cam lifter guide and moving a relative position of the cam lifter according to rotation of the screw shaft.

16. The engine of claim 15, wherein the control portion comprises:
a control motor;
a planetary gear set connected to the screw shaft and configured to transmit rotation of the control motor to the screw shaft;
a worm wheel connected to the planetary gear set; and
a worm gear engaged with the worm wheel.

17. The engine of claim 16, wherein the control portion further comprises:
a control portion housing; and
a housing cover connected to the control portion housing, wherein the planetary gear set, the worm wheel and the worm gear are disposed within the control portion housing.

18. The engine of claim 17, wherein the control portion further comprises:
a position sensor disposed within the control portion housing and configured to detect rotation of the control shaft.

19. The engine of claim 15, wherein
a cam key is formed on the first and second cam portions, respectively;
first and a second sliding holes are formed in the first and second inner brackets, respectively;
a cam key pin, on which a cam key slot where the cam key is slidably inserted therein is formed, is rotatably inserted into the each first sliding hole;
a camshaft pin is connected to the camshaft; and
a slider pin, on which a camshaft pin slot where the camshaft pin is slidably inserted therein is formed, is rotatably inserted into the each second sliding hole.

20. The engine of claim 15, wherein
a cam key is formed on the first and second cam portions, respectively;
first and a second sliding holes are formed in the first and second inner brackets, respectively;
a cam key pin, on which a cam key slot where the cam key is slidably inserted therein is formed, is rotatably inserted into the each first sliding hole; and
a slider pin includes a pin body and a pin head integrally formed with the pin body, and
wherein the pin body is slidably inserted into the camshaft, and the pin head is rotatably inserted into the second sliding hole.

21. The engine of claim 20, wherein
a camshaft oil hole is formed in the camshaft along a length direction thereof;
a body oil hole communicated with the camshaft oil hole is formed in the pin body; and
an oil groove communicated with the body oil hole is formed in the pin head.

* * * * *